(No Model.)
S. A. BAILEY.
NUT LOCK.
No. 258,873.   Patented June 6, 1882.
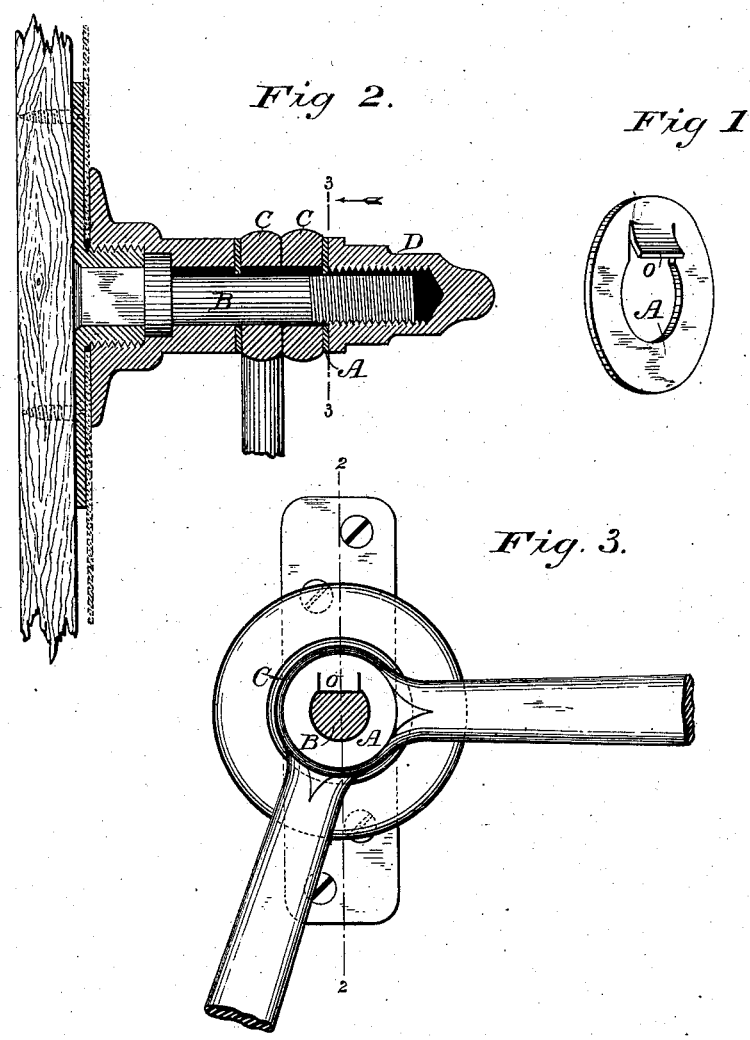
WITNESSES
Wm A. Skinkle.
Geo. W. Breck.
By his Attorney
INVENTOR
S. A. Bailey
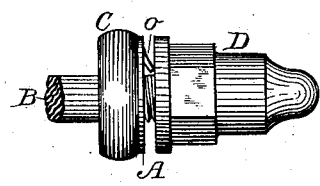

UNITED STATES PATENT OFFICE.

SELDEN A. BAILEY, OF NEW YORK, N. Y.

NUT-LOCK.

SPECIFICATION forming part of Letters Patent No. 258,873, dated June 6, 1882.

Application filed September 24, 1881. (No model.)

*To all whom it may concern:*

Be it known that I, SELDEN A. BAILEY, a citizen of the United States, residing at New York city, in the county of Westchester and State of New York, have invented certain new and useful Improvements in Locking-Washers, of which the following is a specification, reference being had therein to the accompanying drawings.

The object of this invention is to provide a washer of simple construction which may be applied with facility, and which, when the nut is screwed up, will set perfectly tight upon the prop, bolt, or shaft upon which it is placed. A washer of this sort is of especial importance in top-props for carriages, where, if the washer is allowed to move in the slightest degree, the nut soon becomes loosened and lost.

Washers have heretofore been so constructed as to prevent their revolution on the shaft; but it has been found difficult to secure them rigidly thereto.

Figure 1 is a perspective view of this improved washer. Fig. 2 is a longitudinal section on line 2 2 of Fig. 3 of a top-prop with this improved washer in position thereon. Fig. 3 is a transverse section of the same in line 3 3 of Fig. 2. Fig. 4 shows the washer placed in position upon the prop, ready for the nut to be screwed down.

The washer A is here shown in connection with top-props for carriages, being placed upon the prop B between the braces C and nut D. The washer A is a plain flat annular metallic disk of the usual construction, except that it is provided with a short bent-up, square-ended, inwardly-projecting tongue, O. This tongue is formed by two parallel slits cut from the inner edge of the washer about half-way through the same. The inner edge of the washer, instead of being circular throughout, is made straight on one side, and the slits are cut on either side of the straight portion, so that the tongue formed by the slits is square at the end. The tongue of the washer being bent out, the hole thereof is enlarged, so that the washer is slid over the threaded end of the prop with facility. The prop is flattened on one side by filing, or otherwise. After the washer is placed in position the nut is screwed up, and the end of the tongue is thereby forced down tightly and pinches against the flat side of the prop or bolt, and the washer is rigidly locked to the shaft. These washers may be made of steel or iron, and tempered, or not, and applied to various forms of bolts or shafts.

Bolts, shafts, and props already in use may be easily adapted to these washers by simply flattening them on one side with a file.

What is claimed as the invention is—

1. A metallic washer provided at its inner edge with a short tongue formed by transverse slits cut in the body of the washer, said tongue being adapted to open outward for the placing of the washer and to close flush under pressure of the nut, the end of the tongue being square or straight and adapted to bite firmly against a flattened portion of the bolt, shaft, or prop when pressed home, substantially as described.

2. The combination of a prop, bolt, or shaft screw-threaded at one end and flattened on one side, a brace or other part on said prop, a nut for holding said brace, and a washer between the brace and nut provided with a short tongue the end of which bites firmly against the flattened side of the prop as the nut is screwed home and holds the nut rigidly to the shaft, substantially as described.

In testimony whereof I affix my signature in presence of two witnesses.

SELDEN A. BAILEY.

Witnesses:
J. E. BLOOD,
J. R. BAILEY.